H. L. VAUGHAN.
FASTENING DEVICE.
APPLICATION FILED JUNE 22, 1914.
1,145,173. Patented July 6, 1915.
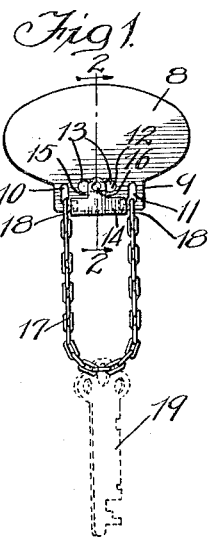
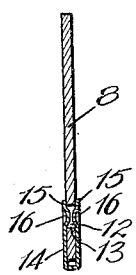
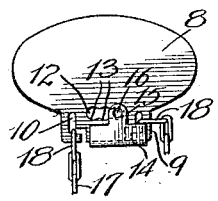
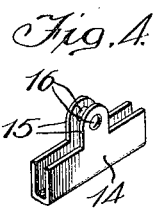
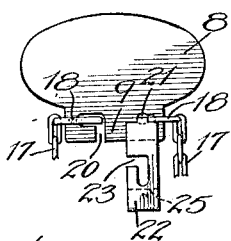
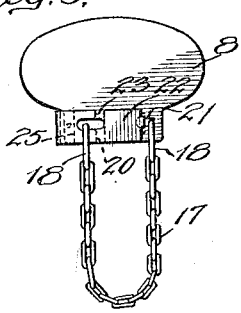
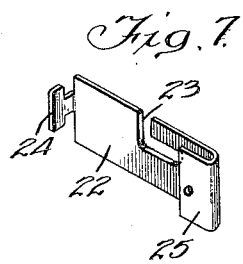
Witnesses:
Inventor:
Harry L. Vaughan
James R. Offield.
Atty.

UNITED STATES PATENT OFFICE.

HARRY L. VAUGHAN, OF CHICAGO, ILLINOIS, ASSIGNOR TO CROWN THROAT & OPENER CO., OF CHICAGO, ILLINOIS, A CORPORATION OF ILLINOIS.

FASTENING DEVICE.

1,145,173.      Specification of Letters Patent.      Patented July 6, 1915.

Application filed June 22, 1914. Serial No. 846,554.

*To all whom it may concern:*

Be it known that I, HARRY L. VAUGHAN, a citizen of the United States, residing in the city of Chicago, county of Cook, and State of Illinois, have invented certain new and useful Improvements in Fastening Devices, of which the following is a specification.

My invention relates in general to a fastening device and the preferred embodiment herein shown is in the form of a key retaining device or key-ring.

The principal object of the invention is to provide a device to which keys or like articles may be secured, and the novelty of the invention resides in the means for connecting or disconnecting the chain or other flexible member upon which the keys are strung to the fastening device.

In a fastening device of this general character, it is very essential that the fastening means be such that it will not become detached and thereby release the flexible member, resulting in the loss of the keys or other articles. It is also important that the fastening means be so designed as to permit of the ready attaching or detaching of the flexible member whereby the keys may be conveniently placed upon or removed from the flexible member.

In the accompanying drawing, I have shown the preferred embodiment of the invention and a slightly modified form thereof.

Figure 1 is a plan view of the preferred form of my fastening device in locked position. Fig. 2 is an enlarged sectional view on the line 2—2 of Fig. 1. Fig. 3 is a plan view similar to Fig. 1, with the device in an unlocked position. Fig. 4 is an enlarged perspective view of the secondary fastening member. Fig. 5 is a plan view of a modified form of structure in locked position. Fig. 6 is a similar view to Fig. 5 in unlocked position. Fig. 7 is an enlarged perspective view of the secondary fastening member of the modified form.

Referring now more particularly to the drawings: My improved structure comprises a main retaining member 8 having an offset portion 9 in which the L shaped slots 10 and 11 are formed, and with one end of each slot open. The metal between the slots is punched away to form the opening 12 and along one edge of which recesses 13 are formed, preferably three in number, as herein shown.

The secondary retaining member 14 comprises a U shaped section of metal having a pair of oppositely disposed ears 15, formed integral therewith, and with a portion of metal in each ear punched inwardly to form the buttons 16.

The width of the channel between the parallel size of the secondary retaining member is only slightly greater than the width of the offset portion 9 of the main retaining member and the length of the secondary retaining member is such that when slipped over the offset portion, the ends of the secondary retaining member cover the open ends of both the slots 10 and 11.

In securing the secondary retaining member to the main retaining member, the ears 15 are slightly sprung apart, due to the fact that the margin between the buttons on the inner surfaces thereof is less than the width of the metal between the slots, so that as the secondary retaining member is slipped over the offset portion the ears will spread until the bottoms enter the opening 12, whereupon the ears spring into their normal position and hold the secondary retaining member to the main retaining member.

A flexible member 17 herein shown in the form of a chain, is provided with loops or links 18 at each end thereof and in securing the chain to the fastening device the secondary fastening member is first moved to one side in order to uncover the open end of the slot 10, as shown in Fig. 3. One of the end links 18 is then passed over the narrow end section of metal formed by the slot, whereupon the secondary retaining member 14 is moved to cover the open end of the slot 10 and to uncover the open end of the slot 11. The link 18 at the other end of the flexible member 17 may be then inserted within the slot 11 and passed over the narrow strip of metal at the other end, whereupon the secondary member is moved into its central position to cover both slots.

The spring action of the ears 15 is sufficient to prevent accidental movement of the secondary retaining member relative to the main retaining member, and the key 19 or any other article that may be strung upon the flexible member 17, therefore is securely connected to the fastening device.

In the modified form of construction but a single slot 20 is formed in the offset portion 9 of the main retaining member 8 for receiving the link 18 of the flexible member. A key hole slot 21 is formed in the offset portion 9 and in this construction I employ a secondary retaining member 22 which is provided with an L shaped slot 23 open at one end. The metal at one end of the member 22 is bent upon itself leaving a margin substantially equal in width to the thickness of the offset portion 9, while a key 24 is formed at the other end of the secondary retaining member 22 and bent at right angles to the body thereof. In securing the secondary member to the main securing member the key 24 is inserted within the key hole, whereupon the secondary member may be moved upon its pivot and, when in closed position as shown in Fig. 5, one end of the offset portion 9 is wedged between the inner surface of the inturned end 25 and the adjacent surface of the secondary retaining member 22. In this modified form of construction one end of the flexible member 17 is connected to the main retaining member by a link which passes through the key hole opening 21 and the other end of the flexible member, which is provided with a relatively large link 26, permits the secondary retaining member to be forced into closed position whereupon the open end of the slot 20 is closed by the secondary retaining member and withdrawal of the flexible member is prevented.

It is to be noted that in both the preferred and modified forms of construction, the shape of the slot for receiving the link 18 is such that a pull upon the flexible member draws the link 18 against a portion of the metal in the main retaining member and not against the secondary retaining member, so that the secondary retaining member is not required to resist any great amount of strain.

While it is obvious that the invention is capable of being further modified in details, I do not wish it to be understood however that I am limited to the precise constructions herein shown, for the reason that the preferred and modified forms illustrated in the drawings represent only the simplest and cheapest forms of construction to manufacture.

Having now described my invention—I claim:

1. A fastening device comprising a main retaining member having a pair of slots formed therein and each slot open at one end, a secondary retaining member slidably mounted on said main retaining member and means for preventing separation of said members.

2. A fastening device comprising a main retaining member having a pair of L shaped slots formed therein and each slot open at one end, a secondary retaining member slidably mounted on said main retaining member, means for preventing separation of said members and a flexible member having loops at each end adapted to enter said slots and retained therein by said secondary retaining member.

3. A fastening device comprising a main retaining member having a pair of slots formed therein and each slot open at one end and a secondary retaining member movably connected to said main retaining member and adapted to close the open ends of said slots.

HARRY L. VAUGHAN.

Witnesses:
 SADIE M. RYAN,
 AVIS HERNIMAN.

Copies of this patent may be obtained for five cents each, by addressing the "Commissioner of Patents, Washington, D. C."